US006510557B1

(12) United States Patent
Thrift

(10) Patent No.: US 6,510,557 B1
(45) Date of Patent: Jan. 21, 2003

(54) APPARATUS FOR THE INTEGRATION OF TELEVISION SIGNALS AND INFORMATION FROM AN INFORMATION SERVICE PROVIDER

(75) Inventor: Philip R. Thrift, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/943,171

(22) Filed: Oct. 3, 1997

Related U.S. Application Data
(60) Provisional application No. 60/034,481, filed on Jan. 3, 1997.

(51) Int. Cl.$^7$ ............................................... H04N 7/173
(52) U.S. Cl. ..................... 725/110; 725/109; 725/111; 725/105
(58) Field of Search ............................ 345/327; 348/13, 348/12, 10, 6, 7; 455/3.1, 4.2, 5.1, 6.1, 6.2, 6.3; 725/110, 109, 111, 112, 131, 133, 100, 51; H04N 1/00, 1/14, 7/173

(56) References Cited

U.S. PATENT DOCUMENTS

| 5,485,221 A | * | 1/1996 | Banker et al. ............... 348/563 |
| 5,654,747 A | * | 8/1997 | Ottesen et al. ................. 348/12 |
| 5,695,400 A | * | 12/1997 | Fennell, Jr. et al. ............ 463/42 |
| 5,734,853 A | * | 3/1998 | Hendricks et al. ............... 348/6 |
| 5,745,569 A | * | 4/1998 | Moskowitz et al. ............ 380/4 |
| 5,751,707 A | * | 5/1998 | Voit et al. ..................... 370/384 |
| 5,754,857 A | * | 5/1998 | Gadol et al. ................. 709/203 |
| 5,818,441 A | * | 10/1998 | Throckmorton et al. ...... 348/13 |
| 5,870,084 A | * | 2/1999 | Kanungo et al. ............ 348/468 |
| 5,929,850 A | * | 7/1999 | Broadwin et al. .......... 345/327 |

OTHER PUBLICATIONS

"Verknupfung von TV Mit Internet," *Funkschau*, vol. 68, No. 18, Aug. 16, 1996.
G. Hirtz, et al. "Open TV: Betriebssystem Fur Interaktives Fernsehen," *Fernseh Und Kinotechnik*, vol. 50, No. 3, pp. 84–89, Mar. 1, 1996.
Peter Wayner, "Inside the NC," *Byte*, vol. 21, No. 11, pp. 105–110, Nov. 1996.
Philip Thrift, et al., "JTV—Java–Enabled Television," *Multimedia Networks: Security, Displays, Terminals and Gateways*, vol. 3228, pp. 117–122, Nov. 4–5, 1997.

* cited by examiner

Primary Examiner—Vivek Srivastava
(74) Attorney, Agent, or Firm—Robert L. Troike; Frederick J. Telecky, Jr.

(57) ABSTRACT

A Java television receiver (10) includes a Java television platform (12) that has a bidirectional Internet connection (14) capable of sending Internet data to the Java television platform (12) and transmitting data from the Java television platform (12) to an Internet provider. Additionally, a tuner/decoder (24) connected to the Java television platform (12) is provided which can receive, tune and decode television signals. An audio/video overlay (32) connected to the Java television platform is provided to combine displays from the Java television platform (12) and television signals from the tuner/decoder (24). Finally, a video output (36) and an audio output (38) sends the combined Internet data and television signals to a television (40).

33 Claims, 2 Drawing Sheets

APPARATUS FOR THE INTEGRATION OF TELEVISION SIGNALS AND INFORMATION FROM AN INFORMATION SERVICE PROVIDER

This application claims the benefit of provisional application No. 60/034,481 filed Jan. 3, 1997.

TECHNICAL FIELD OF THE INVENTION

This invention relates to the field of television viewing and Internet usage and more specifically to an apparatus for the integration of television signals and information from an information service provider.

BACKGROUND OF THE INVENTION

Television viewing is something of a national past time. The vast majority of this nation spend many hours in front of the television watching the latest offerings from the major networks as well as a plethora of cable channels. These programs can be a source of news, they can be educational, or they can be a source of escapist fun. Unfortunately, due to the passive nature of television, the viewer is left to sit and stare at the television without being able to interact with the program being viewed.

The Internet and especially the part of the Internet known as the world wide web has seen tremendous growth in recent years. An outgrowth of ARPANET, a network founded in 1971 to allow defense researchers to share information, several million computers now comprise what is known as the Internet. Surf the web has become a type of battle cry for the computer savvy generation of today. For many of these computerphiles, accessing the world wide web has replaced television as a favorite diversion. The Internet, and in particularly the world wide web, offers the advantage of being more interactive. Web pages offer a hypertext environment such that a user can jump from one subject to the next, exploring and learning information at his or her own pace. The major broadcast and cable networks are not unaware to this medium and have launched Internet sites to enhance their television coverage. For example, during the past election the major networks not only had live broadcast coverage but also had additional information available on their web site. The draw back to this approach is that when a typical user is on the web, he or she is not watching television and therefore can not experience both mediums at the same time. Also, while the Internet provides a more interactive environment, it can't compete with the video capabilities of television.

SUMMARY OF THE INVENTION

From the foregoing, it may be appreciated that a need has arisen for an apparatus that integrates television signals and information from an information service provider so that both can be accessed simultaneously. In accordance with the present invention, an apparatus for the integration of television signals and information from an information service provider is provided which substantially eliminates or reduces disadvantages and problems associated with prior television and Internet access means.

In accordance with one embodiment of the present invention an apparatus is disclosed for the integration of television signals and information from an information service provider. The apparatus includes a television platform that has a bidirectional connection capable of sending information to the television platform and transmitting data from the television platform to an information service provider. Additionally, a tuner/decoder system connected to the television platform is provided which can receive, tune and decode television signals. An audio/video overlay system connected to the television platform is provided to combine displays from the television platform and television signals from the tuner/decoder system. Finally, a video/audio output sends the combined information and television signals to a television monitor.

The present invention provides various technical advantages over conventional television viewing and conventional Internet accessing. For example, one technical advantage is to provide an apparatus for the integration of television signals and Internet data that allows simultaneous viewing of television and access to the Internet. Another technical advantage is the ability to correspond television channels with specific Internet sites and even specific programs with specific Internet sites. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DESCRIPTION OF THE INVENTION

Figure 1:
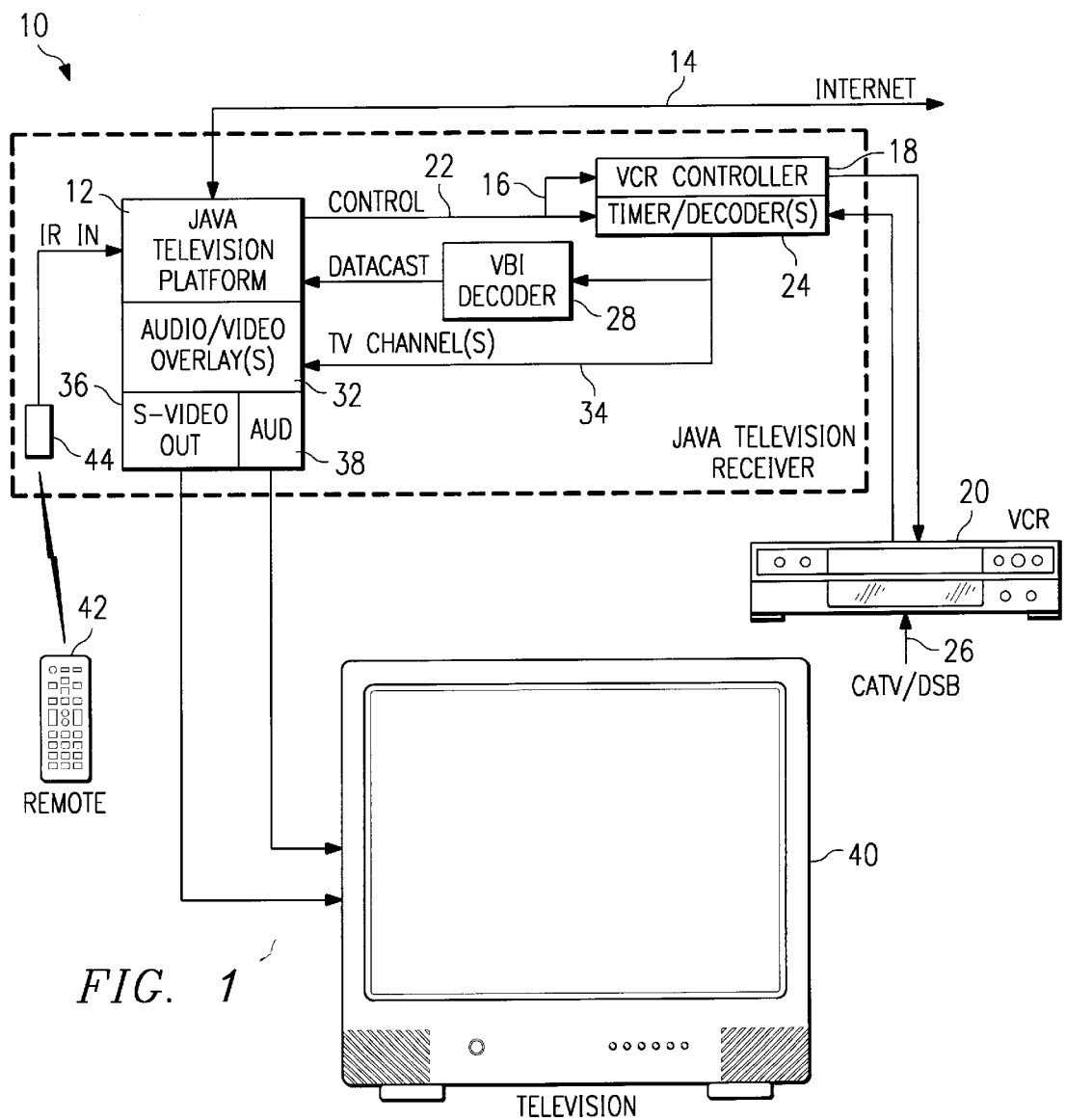
FIG. 1 illustrates a Java television receiver.

FIG. 1 illustrates a Java Television Receiver (JTVR) 10 including a Java television platform (JTVP) 12. JTVP 12 connects to an Internet service provider via a bidirectional Internet connection 14. This can be a conventional phone connection, an ISDN line, a T-1 line, coaxial cable, satellite transceiver, or any other means for connecting to the Internet. A Video Cassette Recorder (VCR) control line 16 connects JTVP 12 to a VCR controller 18 which in turn connects to a VCR 20. A tuner control line 22 connects JTVP 12 to a tuner/decoder 24 which receives an input from a cable television (CATV) source 26. Of course the source can be from a traditional cable television system, a direct broadcast satellite system (DBS), a regular satellite broadcast system, a traditional broadcast system, or any other ways of providing television to the home. This would include a television signal reproduced by VCR 20 or a laser disk player.

A vertical blanking interface (VBI) datacast decoder 28 receives a signal input from tuner/decoder 24 and provides outputs to JTVP 12. Attached to JTVP 12 is an audio/video overlay 32. An output from tuner/decoder 24 feeds the television signal to audio/video overlay 32 via television line 34. The output of audio/video overlay 32 is fed to a video output 36 and an audio output 38. Video output 36 can be a super video output or a regular video output with RCA jack cable support. Audio output 38 can support mono, stereo and surround sound. Video output 36 and audio output 38 connect to a television 40. Also included is a remote control unit 42. Remote control unit 42 may be an infrared mouse and keyboard unit. A remote signal is received by an infrared input connection 44 of JTVR 10.

All of the above components, except for television 40, VCR 20, and remote control unit 42 form JTVR 10. This unit can be assembled as a set top box, manufactured internal to a television, or provided as part of a computer which attaches to television 40.

In operation, tuner/decoder 24 receives a television signal and decodes the signal, if necessary. Multiple tuner/decoder 24 can be used to provide picture in a picture display. From the television signal, a specific television channel signal is chosen by the viewer, corresponding to the channel the viewer wishes to watch. The television channel signal is then output to audio/video overlay 32 and VBI decoder 28. VBI decoder 28 removes any information from the vertical blanking interval, such as closed-captioning information or Teletext text. The vertical blanking interval information is sent to JTVP 12.

JTVP 12 also receives channel information from tuner/decoder 24. JTVP 12 contains channel map information. The channel map information associates a given television channel signal with a uniform resource locator (URL) for that particular television channel. The channel map information could also associate a particular television channel with any other way of specifying a location on an information service provider. For example, if a viewer tunes to the Cable News Network (CNN), the channel map information can associate that channel with the URL of CNN's web site: http://www.cnn.com. With this information, via Internet connection 14, JTVP 12 can retrieve that specific web page from the Internet. Audio/video overlay 24 then will combine the web page, any VBI information and the television channel signal and output this combination to television 40. Typically the combination will result in the regular television broadcast in a first box and the Internet display in a second box. The first and second boxes can be sized and moved around the screen. More sophisticated overlays are also possible. Additionally, information concerning the URL or other Internet information can be sent by the television channel signal in the vertical blanking interval. That information can be decoded by VBI decoder 28 and sent to JTVP 12 where JTVP 12 can then access that URL via Internet connection 14.

Figure 2:
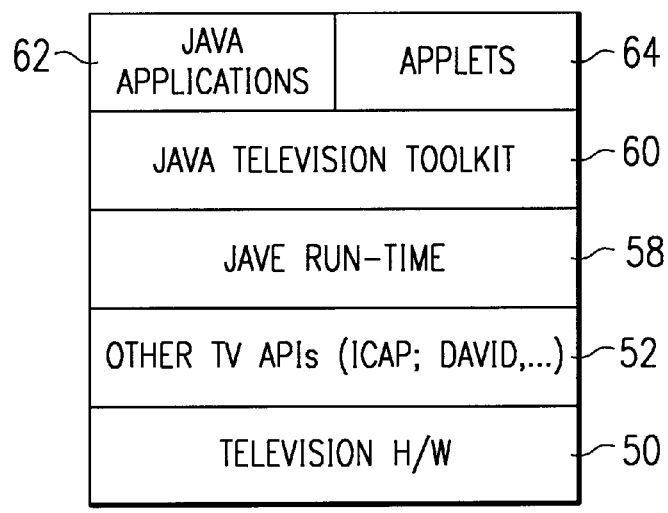
FIG. 2 illustrates Java TV Software/Hardware levels for the Java television receiver.

FIG. 2 illustrates Java TV Software/Hardware levels that would be located in JTVP 12. At the bottom level are television hardware 50. These would include things such as audio and video output as well as channel tuners. The next level are existing interactive TV protocols 52 including Digital Audio/Video Interactive Decoder (DAVID) and Interactive Communications Applications Protocol (ICAP). Layered on top is the basic Java Operating System 58 with Java run time along with any applicable Java extensions. The inclusion of the Java run time facilitates the running of Java applications and Java applets.

The Java Television Toolkit (JTT) 60 is the next level. The toolkit can be thought of as an extension to the Java run time which allows it to perform the applications of JTVP 12 (i.e. integrating the Internet data with the TV broadcast). JTT 60 includes a channel model which are a set of software objects related to television channels and how the channel audio, video, and data are incorporated into the run time environment. The channel model comprises: a ChannelMap which provides an association between the channel properties, including those between the channel number and the associated URL; a ChannelLineup which is an electronic program guide for a channel; a ChannelDataStream which handles the data stream transmitted on the vertical blanking interface; and a ChannelObserver which updates the system based on content change. For example, if a show switches to a commercial break, a new web page related to the product being advertised can be displayed on the screen. This can provide additional product information or an opportunity to order the product.

A part of the Java channel model is the JTVP 12 packages. Each package contains classes, or commands, which are an extension to the basic Java Application Programing Interface (API). These include javatv.control which contains classes to support the integration of television signals and Internet data as well as control television channel and volume selection; javatv.channel which contains classes for supporting channel maps, channel lineups, and channel observers; and, javatv.epg which contains classes for manipulating an electronic program guide.

The final level is the Java Applications 62 and Applets 64. Java is a computing platform that is capable of sitting on top of other computing platforms, such as Microsoft Windows or OS/2. A program written in the Java language can then be run on any computer where the Java platform is present, no matter what the underlying platform is. In the context of the Internet and the world wide web, as long as the program being used to access the web contains the Java platform it can run applets or applications written in Java, no matter what type of computer or the underlying operating system. In other words, one program written in Java should be capable of running on any computer in the world. Since many different users access the Internet using a variety of computers with a multitude of operating system, the rapid growth of Java is not surprising. Applets are programs that require a Java compatible web browser, such as Netscape's Navigator or Sun's HotJava, to run. A Java application is a stand alone program that will run on any computer platform that contains the Java operating system or a sufficient subset of the operating system (Java run time). In the context of the present invention, the Java applications and applets would be designed to integrate Internet data and the television signals and would be based on the commands of the existing Java API and the extensions in the Java television toolkit 60. One such application is JavaVision, a top level user interface for the interactive television environment. In other words, it is akin to a browser. It provides for split screens of television signals and Internet data as well as graphical overlays. It also can provide support for electronic program guides as well as personalized program guides (where a user inputs his preferences and the program compiles a list of television programs that fit that interests). It can also facilitate in the programing of VCR 20.

Figure 3:
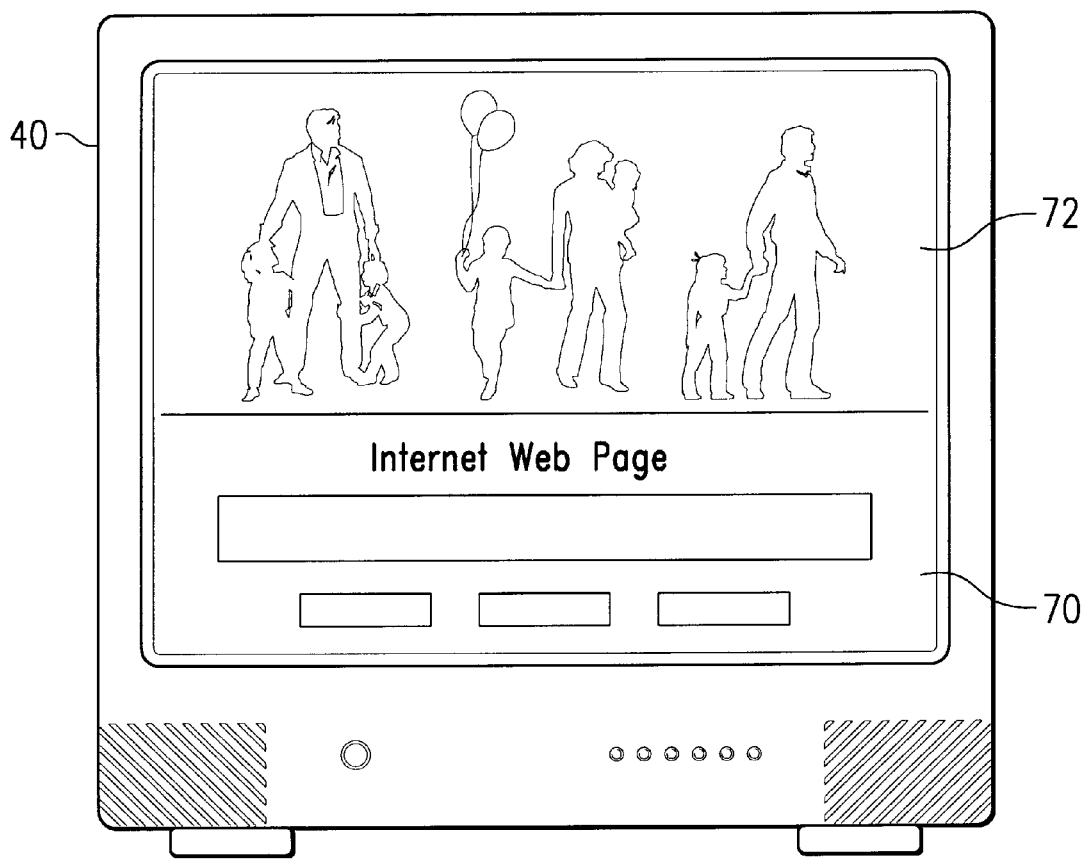
FIG. 3 illustrates a television displaying an Internet web page and a television broadcast.

FIG. 3 illustrates a television 40 displaying an Internet web page 70 and a television broadcast 72. In this example the Internet web page 70 is shown as occupying the bottom of the screen and the television broadcast 72 as occupying the top portion. Of course, any other arrangement of split screens or frames is possible as well as overlaying the information.

In operation, a user would select a station using an infrared remote control. This would trigger the JTVP 12 channel map to send a URL to the Internet provider in order to request a specific web page. Alternatively, information stored in the vertical blanking interval would send a URL to the JTVP 12 and the web page would be retrieved. As an example, consider a viewer watching an episode of a nature program about lions on the Discovery Channel. When the viewer tunes to the Discovery Channel, the web site for the Discovery Channel would appear along with the episode of the nature program. Presumably the web page would have information concerning the nature program, a discussion concerning lions or other mammals as well as connections to other related web sites. As the user views the episode of the nature program, he or she could access this information, thus enhancing the viewing of a show. If the Discovery Channel web page supported a chat room, the viewer could discuss the program with other viewers as he or she viewed the program. During a commercial break, information regarding the advertised product can be retrieved from that products web site and displayed along with the product. On return to the regular program, a return to the Discovery Channel web page can be made.

Thus, it is apparent that there has been provided, in accordance with the present invention, an apparatus for the integration of television signals and Internet data that satisfies the advantages set forth above. Although the present invention has been described in detail, it should be understood that various changes, substitutions, and alterations can be made herein. For example, though the present invention has been discussed in terms of Java applications and Internet providers, the present invention may equally apply to other platform independent languages and other types of information service providers. Other examples may be readily ascertainable by one skilled in the art and can be made herein without departing from the spirit and scope of the present invention as defined by the following claims.

What is claimed is:

1. An apparatus for the integration of television signals and information from an information service provider comprising:
    a Java television platform having a bidirectional connection capable of sending information to the television platform from an information service provider and transmitting data from the television platform to the information service provider;
    said Java television platform including a Java operating system, interactive TV protocols, Java applications and running Java applets;
    a tuner/decoder system operable to receive, tune, and decode television signals, the tuner/decoder system connecting to the Java television platform;
    an audio/video overlay system operable to combine information from the television platform and television signals from the tuner/decoder system; and,
    a video/audio output system operable to send combined information and television signals to a television monitor.

2. The apparatus of claim 1, wherein the television platform is further operable to run a television toolkit, the television toolkit operable to control television channel selection, to manipulate electronic program guide data, and to integrate information and television signals.

3. The apparatus of claim 1, further comprising a vertical blanking interface datacast decoder operable to extract a plurality of text information from the television signal's vertical blanking interval, the vertical blanking interface datacast decoder further operable to send the plurality of text information to the television platform.

4. The apparatus of claim 1, further comprising a video cassette recorder control connected between the television platform and a video cassette recorder, the video cassette recorder control operable to control the recording, playback, fast forward and reverse functions of the video cassette recorder.

5. The apparatus of claim 1, further comprising an infrared receiver unit operable to receive an input from an infrared input device in order to control selection of television signals and information.

6. The apparatus of claim 1, wherein a specific information service provider site is accessed by a channel mapping function stored within the television platform, the channel mapping function associating a specific television channel with the specific information service provider site.

7. The apparatus of claim 6, wherein the specific information service provider site is located by associating a specific television channel with a specific uniform resource locator address.

8. The apparatus of claim 3, wherein a specific information service provider site is accessed by transmitting data to the information service provider containing a specific locator address, the specific locator address sent by a specific television channel in the vertical blanking interval.

9. The apparatus of claim 8, wherein the specific locator address is a uniform resource locator address.

10. The apparatus of claim 1, wherein the information service provider provides Internet data.

11. A television receiver comprising:
    a Java television platform having a bidirectional Internet connection capable of sending Internet data to the Java television platform and transmitting data from the Java television platform to an Internet provider, the Java television platform further operable to run a Java operating system;
    said Java platform having interactive television protocols, Java applications and running Java applets;
    a tuner/decoder system operable to receive, tune and decode television signals, the tuner/decoder system connecting to the Java television platform;
    an audio/video overlay system operable to combine Internet displays from the Java television platform and television signals from the tuner/decoder system;
    a video/audio output system operable to send combined Internet data and television signals to a television monitor;
    a vertical blanking interface datacast decoder operable to extract a plurality of text information from a television signal's vertical blanking interval, the vertical blanking interface datacast decoder further operable to send the plurality of text information to the Java television platform; and,
    an infrared receiver unit coupled to said Java platform to receive an input from an infrared input device in order to control selection of television signals and Internet data.

12. The television receiver of claim 11, wherein a specific Internet site is accessed by a channel mapping function stored within the Java television platform, the channel mapping function associating a specific television channel with a specific uniform resource locator address.

13. The television receiver of claim 11, wherein a specific Internet address is accessed by transmitting data to the Internet provider containing a specific uniform resource locator address, the uniform resource address sent by a specific television channel in the vertical blanking interval.

14. The television receiver of claim 11, further comprising a video cassette recorder control connected between the Java television platform and a video cassette recorder, the video cassette recorder control operable to control the recording, playback, fast forward and reverse functions of the video cassette recorder.

15. A method for combining television signals with information from an information service provider, comprising the steps of:
    selecting a television channel signal from a television broadcast source;
    identifying a specific site on an information service provider network for a given television channel;

said step of identifying a specific site further consisting of sending information concerning the specific site in a vertical blanking interface of the television channel signal, decoding the information using a vertical blanking interface decoder and sending the information to the information service provider;

locating the specific site;

sending a plurality of information and images from the specific site to a television platform;

combining the plurality of information and images with the television channel signal; and displaying the combination on a television.

16. The method of claim 15, wherein the information service provider is an Internet service provider.

17. The method of claim 15, wherein the step of identifying a specific site further consists of using a channel map to associate the television channel signal with the specific site.

18. An apparatus for the integration of television signals and information from an information service provider comprising:

a television platform having a bidirectional connection capable of sending information to the television platform from an information service provider and transmitting data from the television platform to the information service provider;

a tuner/decoder system operable to receive, tune, and decode television signals, the tuner/decoder system connecting to the television platform;

an audio/video overlay system operable to combine information from the television platform and television signals from the tuner/decoder system; and a video/audio output system operable to send combined information and television signals to a television monitor.

19. The apparatus of claim 18, wherein the television platform is further operable to run a Java operating system.

20. The apparatus of claim 19, wherein the television platform is further operable to run Java applications and applets.

21. The apparatus of claim 18, wherein the television platform is further operable to run a television toolkit, the television toolkit operable to control television channel selection, to manipulate electronic program guide data, and to integrate information and television signals.

22. The apparatus of claim 18, further comprising a vertical blanking interface datacast decoder operable to extract a plurality of text information from the television signal's vertical blanking interval, the vertical blanking interface datacast decoder further operable to send the plurality of text information to the television platform.

23. The apparatus of claim 18, further comprising a video casette recorder control connected between the television platform and a video cassette recorder, the video cassette recorder control operable to control the recording, playback, fast forward and reverse functions of the video cassette recorder.

24. The apparatus of claim 18, further comprising an infrared receiver unit operable to receive an input from an infrared input device in order to control selection of television signals and information.

25. The apparatus of claim 18, wherein a specific information service provider site is accessed by a channel mapping function stored within the television platform, the channel mapping function associating a specific television channel with the specific information service provider site.

26. The apparatus of claim 25, wherein the specific information service provider site is located by associating a specific television channel with a specific uniform resource locator address.

27. The apparatus of claim 22, wherein a specific information service provider site is accessed by transmitting data to the information service provider containing a specific locator address, the specific locator address sent by a specific television channel in the vertical blanking interval.

28. The apparatus of claim 27, wherein the specific locator address is a uniform resource locator address.

29. The apparatus of claim 18, wherein the information service provider provides Internet data.

30. A method for combining television signals with information from an information service provider, comprising the steps of:

selecting a television channel signal from a television broadcast source;

identifying a specific site on an information service provider network for a given television channel;

locating the specific site;

sending a plurality of information and images from the specific site to a television platform;

combining the plurality of information and images with the television channel signal; and displaying the combination on a television.

31. The method of claim 30, wherein the information service provider is an Internet provider.

32. The method of claim 30 wherein the step of identifying a specific site further comprises the step of using a channel map to associate the television channel signal with the specific site.

33. The method of claim 32, wherein the step of identifying a specific site further comprises the step of sending information concerning the specific site in a vertical blanking interface interface of the television channel signal, decoding the information using a vertical blanking interface decoder and sending the information to the information service provider.

* * * * *